Aug. 4, 1936.   W. L. MORRISON   2,050,015
PROTECTIVE DEVICE FOR MOTOR VEHICLES
Filed Dec. 21, 1935   2 Sheets-Sheet 2
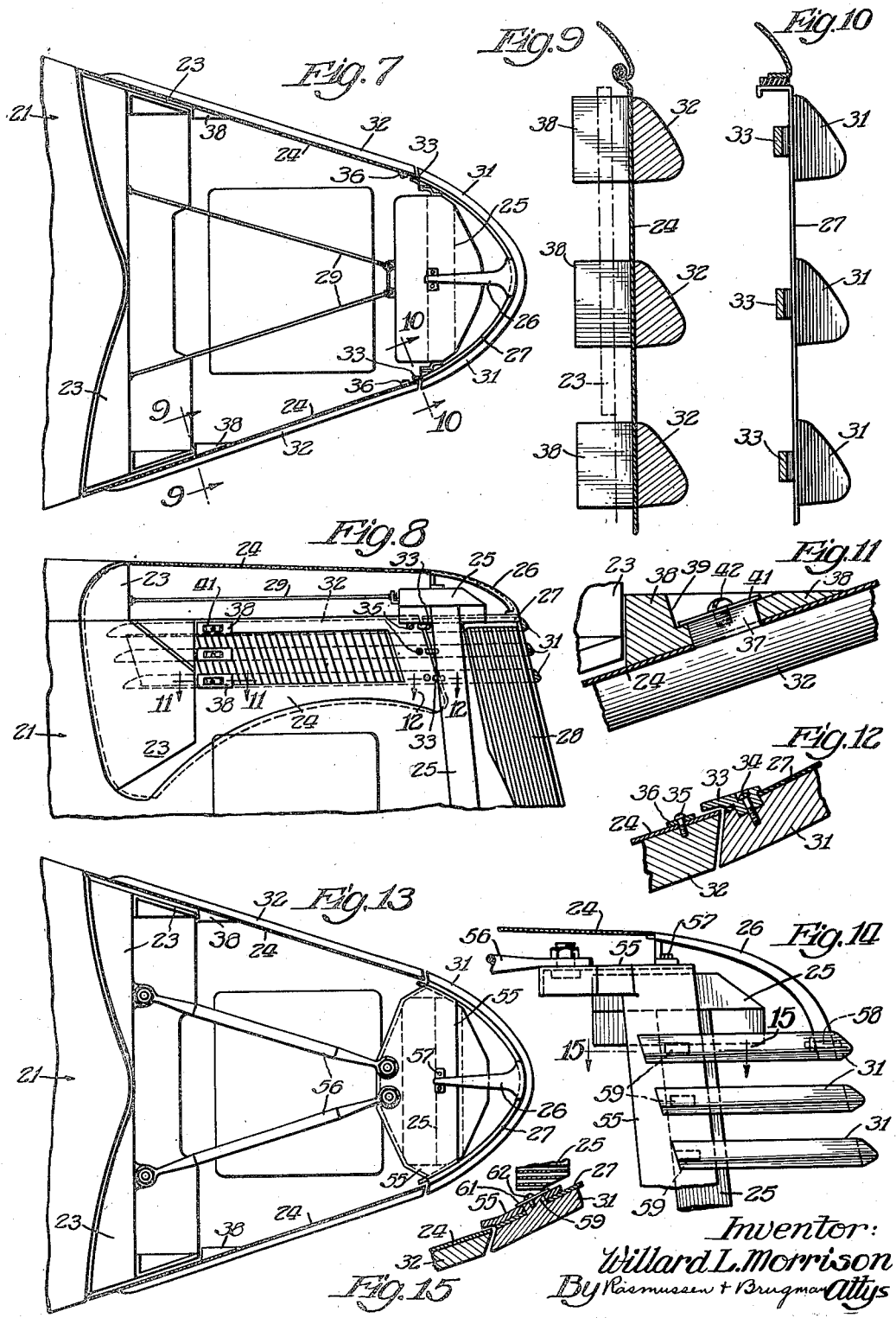
Inventor:
Willard L. Morrison
By Rasmussen + Brugman Attys Patented Aug. 4, 1936

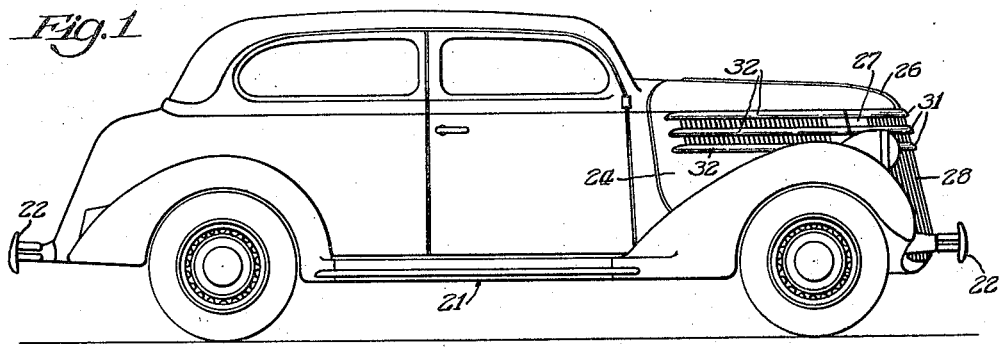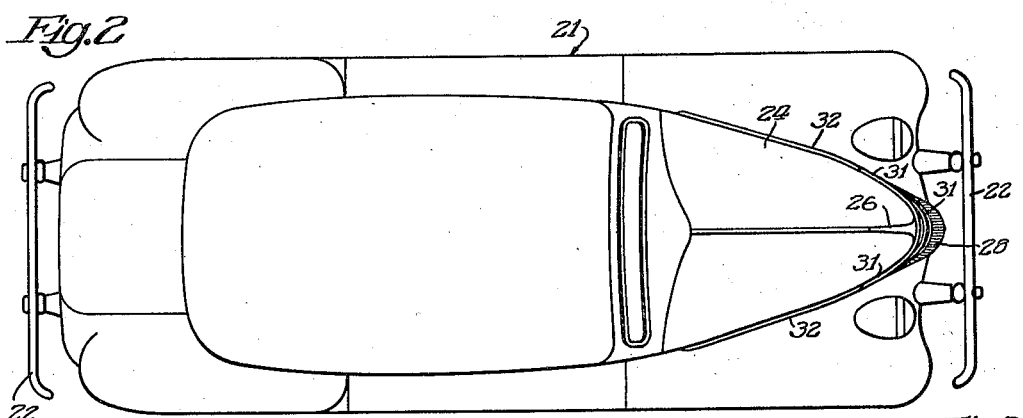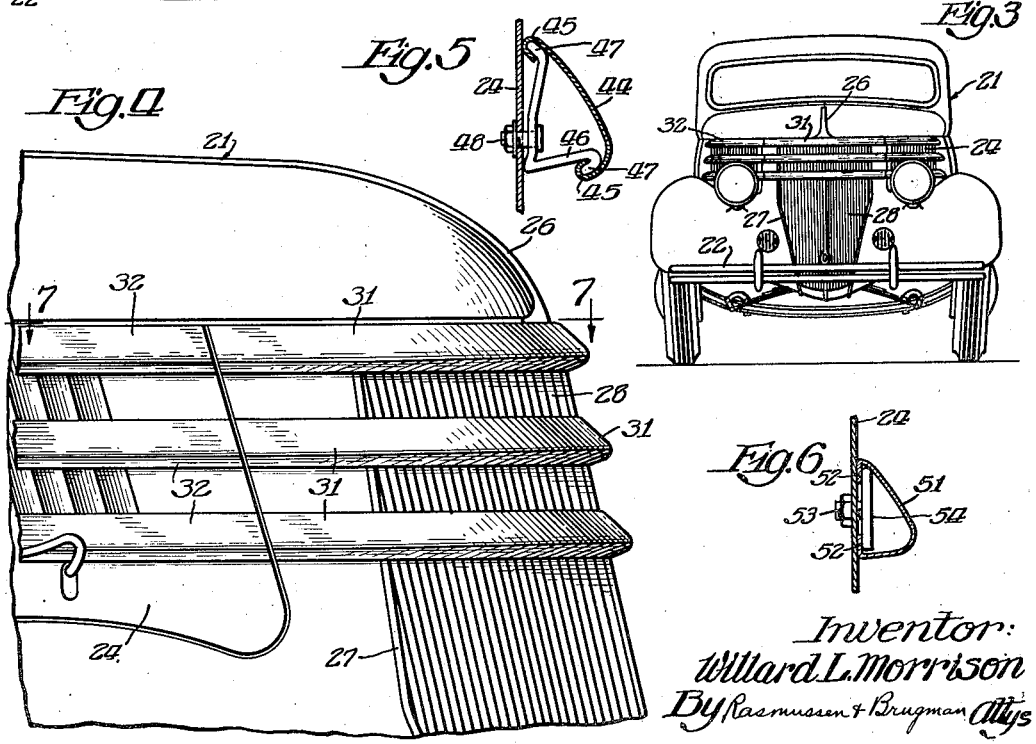

2,050,015

UNITED STATES PATENT OFFICE 2,050,015

PROTECTIVE DEVICE FOR MOTOR VEHICLES

Willard L. Morrison, Lake Forest, Ill.

Application December 21, 1935, Serial No. 55,548

5 Claims. (Cl. 180—69)

This invention relates in general to motor vehicles, and more particularly to an auxiliary bumper or protective device for the upper front portion of such vehicles.

A principal object of the invention is the provision of a protective device for the radiator grille and hood of a motor vehicle, comprising means extending around these parts for transmitting outside forces applied thereto to the frame of the vehicle.

Another important object of the invention is the provision of a plurality of vertically spaced, horizontal ribs or struts surrounding the upper portion of the radiator grille and hood of a motor vehicle and adapted to be used as standard or optional equipment.

Numerous other objects and advantages of the invention will be apparent as it is better understood from the following description, which, when taken in connection with the accompanying drawings, discloses a preferred embodiment thereof.

In the drawings,

Figure 1 is a side elevation of a motor vehicle having a radiator grille and hood protective device embodying the features of the invention secured thereto;

Fig. 2 is a top plan view of the vehicle of Fig. 1;

Fig. 3 is a front elevational view of the vehicle of Figs. 1 and 2;

Fig. 4 is an enlarged side elevation of a part of the hood and radiator portion of the vehicle of Fig. 1;

Fig. 5 is a detail vertical section of a modified form of rib or strut member;

Fig. 6 is a view similar to Fig. 5 of another modified form of rib or strut member;

Fig. 7 is a detail horizontal section taken substantially on the line 7—7 of Fig. 4;

Fig. 8 is an elevational view, partly in section, of the Figs. 4 and 7 with one side of the hood and radiator grille removed;

Fig. 9 is a vertical section taken substantially on the line 9—9 of Fig. 7;

Fig. 10 is a vertical sectional view taken substantially on the line 10—10 of Fig. 7;

Fig. 11 is a detail horizontal section taken substantially on the line 11—11 of Fig. 8;

Fig. 12 is a detail horizontal sectional view taken substantially on the line 12—12 of Fig. 8;

Fig. 13 is a horizontal sectional view similar to Fig. 7 of a modified form of the invention;

Fig. 14 is detail elevation, partly in section and with parts removed, of the front part of the mechanism of Fig. 13; and Fig. 15 is a horizontal sectional view taken substantially on the line 15—15 of Fig. 14 with the radiator grille frame in place.

Referring more particularly to the drawings, reference numeral 21 indicates in general a motor vehicle of any desired model, having the usual bumpers 22, chassis or frame 23 (Figs. 7, 8, and 13), hood 24, having the usual louvres 10 therein, radiator 25, front hood supporting brace 26, radiator grille frame 27, and radiator grille 28 spaced forwardly of the radiator 25. The hood supporting brace 26 is mounted at its forward end on the radiator grille frame 27 in the usual manner, and the upper end of the radiator 25 is connected to the cowl portion of the frame 23 by the usual tie rods 29.

A protective device or auxiliary bumper, constituting the instant invention, comprises a plurality of curved ribs or struts 31 encircling the radiator grille 28 and disposed in horizontal planes spaced vertically from each other, and a plurality of similar ribs or struts 32 horizontally disposed on each side of the hood 24 in alinement with the ribs 31, each rib 31 having a strut 32 substantially abutting against each of its ends. The members 31 and 32 may be positioned and spaced apart as desired with any suitable number thereof being employed.

Referring more particularly to Figs. 7 to 12, inclusive, the ribs 31 are secured to the radiator grille frame 27 by dogs or lugs 33 and screws 34 which are located adjacent each end of each rib. By providing a suitable recess in the rib 31 within which a portion of the lug 33 may be seated, as shown in Fig. 12, shearing of screw 34 will be prevented. The rear end of each lug 33 extends beyond the end of the rib 31 behind the forward end of the associated strut 32. With this arrangement, when any exterior force is applied to the rib 31, it will be transmitted directly to the associated strut 32, since the underlapping portion of the lug 33 will prevent the end of the rib 31 from sliding or springing outwardly out of contact with the end of the strut 32.

Additional fastening means may be employed if necessary to insure the proper positioning of the ribs 31. If it is desired, especially where the protective device is to be added to a completed vehicle as supplementary equipment, the several ribs 31 may be joined together as a unit by vertical straps to decrease the necessary number of points of attachment.

Adjacent their forward ends, each of the struts 32 may be secured to the hood 24 by a screw 35 (Fig. 12), the head of which is spaced from the hood by a suitable washer 36. Each strut 32 is provided adjacent its rear end with an inwardly extending projection 37 (Figs. 8 and 11) which is adapted to extend through the hood 24 and an aperture of the same shape in a lug 38. The lug 38 is provided with an enlarged recess 39 in its inner surface, and a washer 41 is seated on the bottom surface of this recess. The washer 41 is secured in this position by a screw 42 which is screwed into the projection 37 to maintain the lug 38 and the rear end of the strut 32 in desired position.

The rear surface of each of the lugs 38 substantially abuts against a vertical wall of the cowl portion of the frame 23. Thus, any force transmitted from the ribs 31 to the struts 32 will be transmitted directly to the frame 23 by the lugs 38. It will be understood that the projection 37 may be eliminated if the dimensions of the screw 42 or other retaining means used are such as to prevent shearing thereof.

In Fig. 5, a modified form of strut 44 is disclosed which is constructed from heavy gauge sheet metal, instead of being made from solid or drawn stock like the struts 32. The main portion of the strut 44 is curved, and each of its edge portions are rolled to form an open bead 45. These beads 45 not only strengthen the strut, but also provide a means for attaching the strut to the hood 24. A substantially right-angled bracket 46 is provided with curved end portions 47 which engage within the beads 45. A bolt 48 engages the upper leg of the bracket 46 and the hood 24 to draw the strut 44 against the hood at two points, that is, where the lower part of the bracket contacts the hood and where the upper bead 45 contacts the hood. Any number of strut retaining brackets 46 may be used for each strut 44 that may be desired.

This type of strut has the advantage over a solid strut of causing very little interference with the flow of air through the louvres in the sides of the hood 24 when the struts are positioned over these louvres, as shown in the drawings. The curved cross-sectional shape of the strut 44 provides sufficient strength and rigidity to prevent buckling of the strut under longitudinally applied forces transmitted from the associated curved rib 31.

In Fig. 6, another modified form of strut 51 is disclosed which is also constructed from heavy gauge sheet metal but of a different cross-sectional shape than that of the strut 44. The strut 51 is curved to provide a peripheral outline similar to the members 31 and 32, and the marginal edges are bent to form vertical flanges 52. To secure the strut 51 to the hood 24, a bolt 53 is provided having an elongated head portion 54 the ends of which engage both of the flanges 52. Here too, any desired number of retaining bolts 53 may be used with each strut 51.

Referring now to Figs. 13, 14, and 15, a modified form of protective device is shown in which the exterior rib or strut structure is substantially the same as that above described, but which has certain additional strengthening features. A supplemental frame member 55 is provided which has a horizontal portion adjacent to and above the radiator 25 and a pair of vertically disposed side portions extending downwardly therefrom on each side of the radiator. The frame member 55 is secured to the cowl portion of the main frame 23 by means of a pair of struts 56, and the hood supporting brace 26 may be secured at its rear end to the frame 55 at 57.

The upper one of the several curved ribs 31, or each of them, may be secured, as at 58, to the forward part of the hood supporting brace 26. Adjacent each of their ends, each of the ribs 31 is rigidly secured to the supplemental frame member 55. This may be accomplished by providing the ribs 31 with an inwardly extending projection 59 adjacent the ends thereof and formed integral therewith (Fig. 15), which extends through suitable apertures in the radiator grille frame 27 and the vertical portion of the frame 55 associated therewith and is secured to the latter by a suitable retaining plate 61 and screw 62.

The forward edge of each of the vertical portions of the frame 55 preferably extends beyond the ends of the ribs 31 to underlap the ends of the struts 32, similar to the rearward extensions on the lugs 33, to prevent dislocation of the ends of the ribs 31 from the ends of the associated struts 32. The struts 32 are provided with lugs 38 adjacent their rear ends in substantially abutting relationship with the frame 23.

With this modified construction, any exterior forces applied to the ribs 31 will be transmitted directly to the frame 23, not only by the struts 32 and lugs 38, but also by the member 26, projections 59, frame 55 and struts 56.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a motor vehicle having a frame, a hood portion and a radiator grille; a protective device, comprising a plurality of curved ribs surrounding said radiator grille, and strut members positioned exteriorly of said hood in alinement with said ribs for transmitting forces applied to said ribs directly to the frame of the vehicle.

2. In a motor vehicle having a frame, a hood portion and a radiator grille; a protective device, comprising a plurality of curved ribs surrounding said radiator grille, and a plurality of strut members mounted on said hood in alinement with said ribs and extending rearwardly therefrom for transmitting forces applied to said ribs to the frame of the vehicle.

3. In a motor vehicle having a frame, a hood portion and a radiator grille; a protective device, comprising a plurality of curved ribs surrounding said radiator grille, a plurality of strut members mounted on said hood in alinement with said ribs and extending rearwardly therefrom, and means secured to said strut members adjacent their rear ends for transmitting forces applied to said ribs and through said strut members to the frame of the vehicle.

4. In a motor vehicle having a frame, a hood portion and a radiator grille; a protective device, comprising a curved rib member surrounding said radiator grille, rearwardly extending strut members positioned exteriorly of said hood with their forward ends abutting against the ends of said rib member, and means secured to said strut members adjacent their rear ends for transmitting any forces applied to said rib member and through said strut members directly to the frame of the vehicle.

5. In a motor vehicle having a frame, a hood portion and a radiator grille, a protective device, comprising a curved rib member surrounding said radiator grille, a supplemental frame member, means for securing said rib to said supplemental frame, means for securing said supplemental frame to the frame of the vehicle, rearwardly extending strut members positioned exteriorly of said hood with their forward ends abutting against the ends of said rib member, and means secured to said strut members adjacent their rear ends for transmitting forces applied longitudinally of said strut members to the frame of the vehicle.

WILLARD L. MORRISON.